Oct. 14, 1941.  J. F. GRAHAM  2,258,928
APPARATUS FOR CLEANING COTTON
Filed Dec. 13, 1938  2 Sheets-Sheet 1
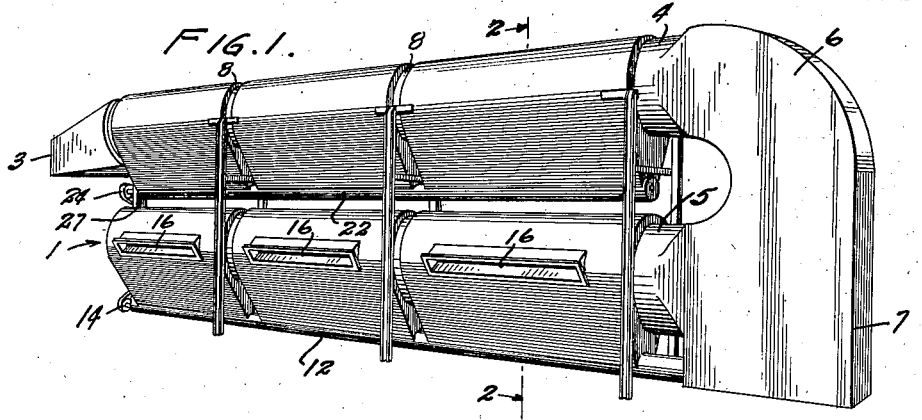
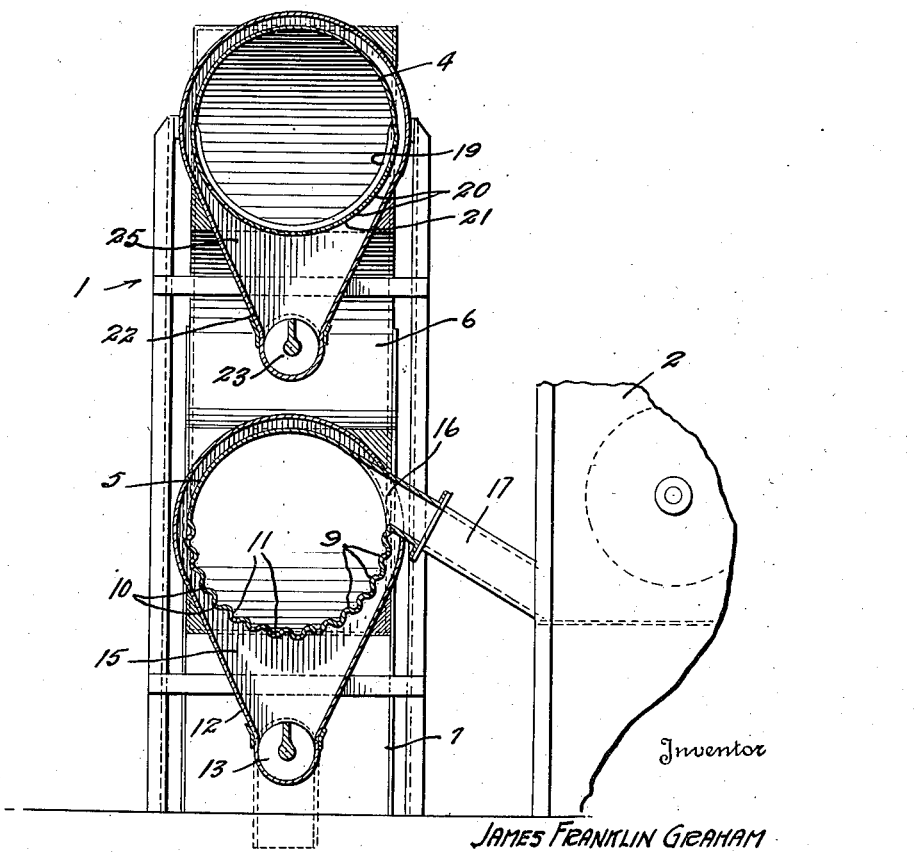
Inventor
JAMES FRANKLIN GRAHAM
By Semmes, Keegin & Semmes
Attorneys Oct. 14, 1941.  J. F. GRAHAM  2,258,928
APPARATUS FOR CLEANING COTTON
Filed Dec. 13, 1938   2 Sheets-Sheet 2
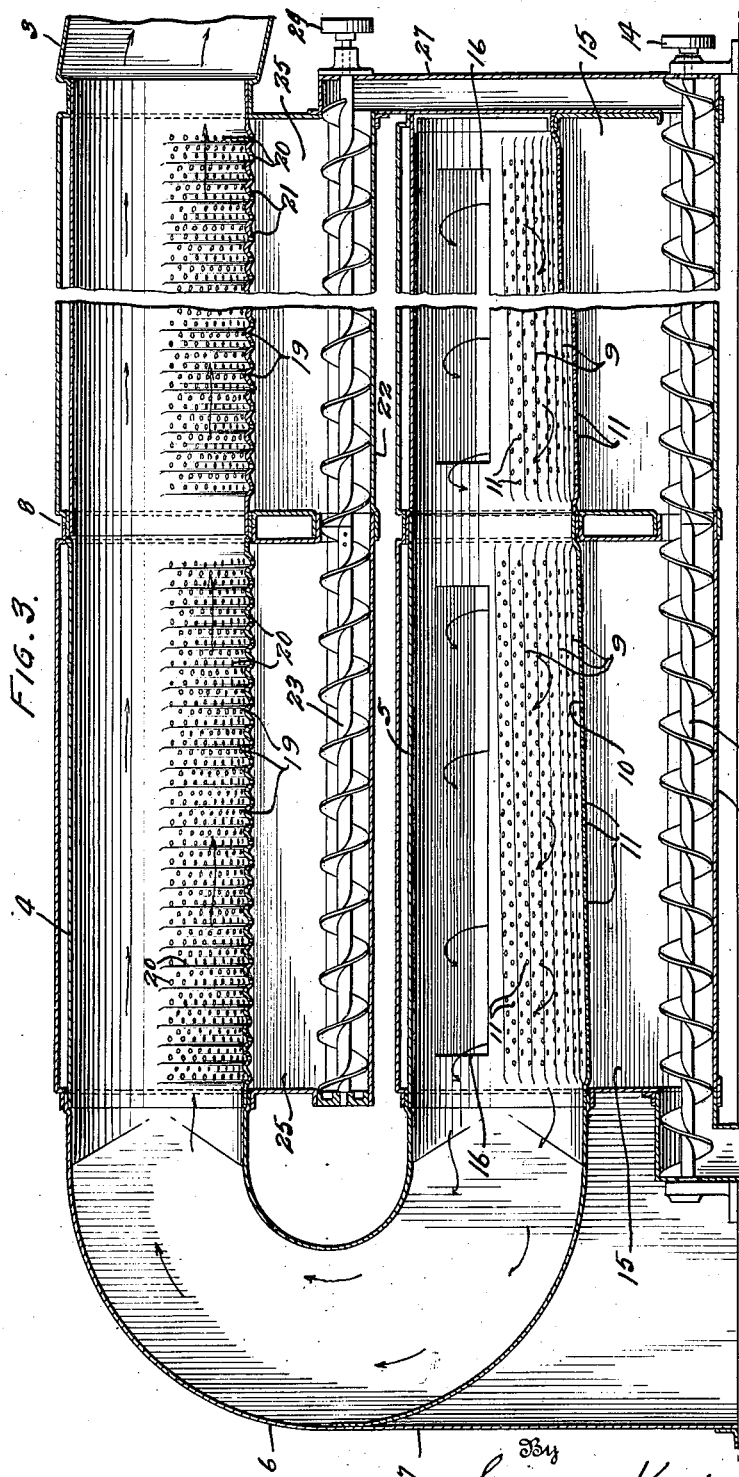
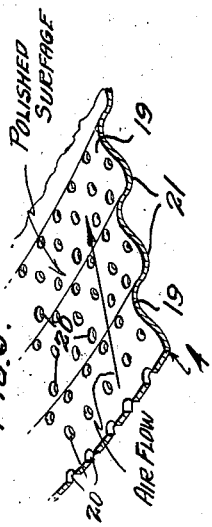
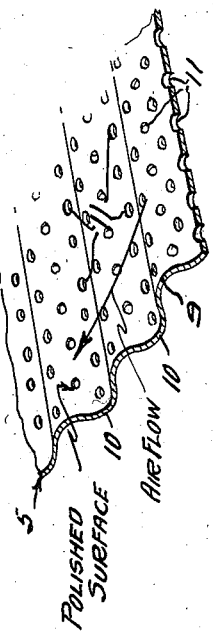
Inventor
JAMES FRANKLIN GRAHAM
By Semmes, Keegin & Semmes
Attorneys Patented Oct. 14, 1941

2,258,928

UNITED STATES PATENT OFFICE 2,258,928

APPARATUS FOR CLEANING COTTON

James Franklin Graham, West Memphis, Ark.

Application December 13, 1938, Serial No. 245,492

7 Claims. (Cl. 19—72)

My invention relates in general to a process and apparatus for treating cotton and more particularly to a process and apparatus for removing foreign substances from the cotton after it has left the ginning machine and prior to its entry into the baling apparatus.

It is, of course, well known that after cotton has been ginned it is then transmitted to a machine wherein it is baled. However, foreign materials, such as, dirt, dust, lint, and leaves, are usually carried along with the cotton into the baling machine. It will be readily appreciated that the presence of such substances in the baled cotton lowers the grade thereof and costs the producer an incalculable amount of money. Various methods have been heretofore resorted to in an endeavor to remove such foreign substances, but for the most part they have proven inadequate. The most common procedure has been to try and remove the foreign substances prior to the passage of the cotton through the ginning machine. This process, however, is inefficient. Therefore, no practical process or machine has to date been devised whereby foreign materials could be easily and cheaply removed from the cotton.

An important object of the present invention is to overcome the difficulties now present in this art.

Another object of the present invention is to provide a process and apparatus for removing foreign substances from cotton after the cotton has left the gin and prior to its entry into the baling machine.

Yet another object of the present invention is to provide a process and apparatus for removing foreign substances from cotton which may be used with equal results in connection with all types of ginning machines.

A still further object of the present invention is to provide a process and apparatus for removing foreign substances from cotton after the cotton has left the ginning machine, in which there is no danger of the foreign materials re-entering the cleaned cotton.

And yet a further object of this invention is to provide a machine for removing foreign substances from cotton after it has been ginned, which is simple in construction and operation and which is relatively inexpensive to manufacture.

To achieve the above and other important objects, this invention embodies the idea of removing the foreign substances from the cotton after it leaves the gin and while it is in transit to the baling machine. More specifically there is employed a corrugated flue arrangement which is so constructed that the air created by the brushes in the gin and entering the flue tangentially impart a motion to the cotton fibers that is transverse to the corrugations. The cotton fibers are agitated and the heavier foreign substances fall through the apertures in the corrugations from whence they fall onto a conveyor which removes the foreign substances to a suitable outlet. In addition the arrangement is such that there can be no danger of the foreign substances re-entering the flue when they fall onto the conveyor.

In order to make my invention more easily understood, there is depicted in the accompanying drawings, means for carrying the same into practical effect without limiting the improvements in their useful applications to the particular constructions which, for the purpose of explanation, have been made the subject of illustration.

In the drawings in which like numerals designate the same or similar parts:

Figure 1 is a view in perspective showing my invention used in connection with the so-called "three-stand gin."

Figure 2 is a view taken along line 2—2 of Fig. 1 looking in the direction of the arrows.

Figure 3 is a fragmental sectional view of the apparatus shown in Figure 1.

Figure 4 is a fragmental perspective view of the lower half of the lower flue.

Figure 5 is a fragmental perspective view of the lower half of the upper flue.

In the drawings, and more particularly in Figures 1 and 2, my novel cleaning apparatus is designated 1, a ginning machine 2, and an outlet 3 to the baling machine (not shown). While the drawings show my inventive concept used in conjunction with a "three-stand gin," it is, of course, to be understood that it can be used with a gin having any number of stands.

It is, of course, well known that after the cotton leaves the ginning machine, it is quite fluffy and in small shredded fibers, thereby being in a condition to be more readily cleaned. As hereinbefore adverted to, with my invention the foreign substances are removed while the cotton is in this state. The cleaning apparatus 1 comprises an upper flue 4 and a lower flue 5 which are joined at the end opposite the outlet 3 by means of an elbow 6 suitably supported by the member 7. It can be readily seen from Figure 1 that the cleaning apparatus 1 is made up of a plurality of upper and lower sections and in this particular instance three, which can be removably united in any convenient manner, such as illustrated by the numeral 8.

The upper half of the flue 5 is solid whereas the lower half is formed with longitudinally extending corrugations 9. A plurality of apertures 11 are provided in the corrugations and the lower half of the flue is somewhat like a sieve. In view of the fact that cotton fibers adhere to rough surfaces, the flue walls are highly polished so that there can be no danger of the cotton fibers clogging the apertures.

Positioned below the flue 5 and hermetically joined thereto in any suitable manner is a trough 12 in which is suitably journaled an endless conveyor 13 of the screw type. Movement may be transmitted to the conveyor 13 from any suitable source of power through the member 14. The conveyor moves toward the left of the apparatus 1 as illustrated in Figure 3. The space 15 between the flue 5 and the conveyor 13 is a "dead air" space, the purpose of which will later become more apparent.

In Figures 2 and 3, it should be noted that an inlet opening 16 is provided in the upper area of the flue 5 and is in communication with the interior of the flue. An outlet mouth 17 from the gin 2 is adapted to be connected to the opening 16 so as to enable the cotton fibers to enter the interior of the flue 5 tangentially after these fibers leave the ginning machine.

The upper half of the flue 4 is solid and the lower half is formed with corrugations 19 which extend transversely thereof. A plurality of apertures 20 are formed in the corrugations 19 for the same reasons hereinbefore pointed out in connection with the construction of the lower flue 5.

The inner surface of the upper flue 4 is also highly polished to prevent the cotton fibers from clogging the apertures 20.

There is also positioned below the upper flue 4 and suitably attached thereto a trough 22. A screw conveyor 23 is journaled in the trough 22 in any convenient manner, and movement is transmitted thereto through the member 24. It should be noted that the conveyor 23 moves in an opposite direction to the conveyor 13 as is readily apparent from an inspection of Figure 3. A "dead air" space 25 is also provided between the upper flue 4 and the conveyor 23.

It can be seen in Figure 3 that the conveyor 23 deposits the foreign substances into a vertical outlet 27 which in turn communicates with the conveyor 13. The conveyor 13 is provided with a discharge outlet 28 into which the foreign substances from both conveyors 13 and 23 are deposited. While I have shown the conveyor 23 directly associated with the conveyor 13, it is to be understood that the upper conveyor can deposit its contents into a separate outlet.

A further way to remove the foreign substances is to use a suction device of any suitable construction. For example, pipes can be attached to the "dead air" space of each flue section and a suction fan or the like can be disposed at the discharge end of the pipes. The volume of air suction will be regulated so that it will not interfere with the air current in the flue itself. With this arrangement the foreign materials can be easily removed and there can be no danger of the same re-entering the flue. The foreign materials can be discharged from the suction fan in any convenient manner.

In view of the fact that the discharge outlet 28 is of considerably less size than that of the outlet 3, the spaces 15 and 25 will be substantially devoid of air. By virtue of these "dead air" spaces, there can be no danger of the foreign substances re-entering the flues. If necessary, the discharge outlet 28 may be provided with a hinged flap that can be of any desirable construction. Moreover, it is possible in lieu of the screw conveyor shown to employ a continuous flow of water to carry off the foreign substances.

The operation of my invention is as follows. After the cotton has been ginned, the cotton fibers leave the ginning machine and are admitted into the lower flue 5 by the inlet opening 16. The brushes in the gin create sufficient air current, but in the event the gin will not create sufficient current, it is, of course, obvious that means may be provided to accomplish the necessary result. The air and cotton fibers enter the upper area of the lower flue 5 tangentially and pass therethrough with a circular motion. The motion of the air and cotton is transverse to the longitudinally extending corrugations. The corrugations will agitate the cotton fibers, and the heavier foreign substances will fall through apertures 11 and are prevented from re-entering the flue and becoming mixed with the cotton by the "dead air" spaces. The foreign substances are then deposited onto the conveyor 13 from whence they are moved to the outlet 28. Inasmuch as the inner surface of the flue 5 is highly polished there can be no danger of the cotton fibers adhering to the flue or clogging the apertures 11.

When the air currents together with the cotton fibers enter the elbow 6, their movement will be altered from a circular motion to a longitudinal movement and they will enter the upper flue 4 flowing in a straight path. However, since the corrugations 19 extend transversely of the upper flue 4, the cotton fibers will again be agitated and the heavier foreign substances which were not removed while passing through the lower flue will fall through the apertures 20 and thence onto the screw conveyor 23. The conveyor 23 will then move the foreign substances to the outlet 27, and they will in turn drop onto the conveyor 13 and be conveyed to the discharge drain 28.

After the cotton has traversed the upper flue 4, it is then directed into the baling machine through the outlet opening 3.

It will be readily appreciated from the foregoing description that I have provided a process and apparatus for removing foreign substances from cotton after the cotton has left the gin which will effectively remove all foreign matter from the cotton fibers. Moreover, the process can be carried out in connection with all types of ginning apparatus, and the apparatus employed to accomplish the desired results can be easily and cheaply manufactured. Also by the use of my invention it is not possible for the foreign substances to re-enter the cotton fibers after they have been removed therefrom. The apparatus for accomplishing the desired results is a compact unit and consists of relatively few working parts.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An apparatus for removing foreign substances from cotton fibers after said fibers have left the gin comprising a lower flue provided with longitudinal corrugations, an upper flue having transversely extending corrugations, an elbow joining said lower and upper flues, means to admit the cotton fibers and air from the gin into the lower flue so that they travel in a transverse direction to said corrugations whereby the foreign substances will be removed from the cotton, apertures in said corrugations through which the foreign substances are discharged, a conveyor positioned beneath the flue onto which the foreign substances are deposited, said elbow being adapted to change the movement of the cotton fibers and air currents leaving the lower flue so that the movement of the fibers and air currents will be in a direction transverse to the corrugations in the upper flue whereby the foreign substances still remaining in the cotton fibers will fall through apertures in the corrugations of the upper flue, a conveyor located beneath said upper flue onto which the foreign substances are deposited and means to convey the foreign substances deposited onto the upper conveyor to the conveyor associated with said lower flue.

2. An apparatus for removing foreign substances from cotton fibers after said fibers have left the gin comprising a lower flue provided with longitudinal corrugations, an upper flue having transversely extending corrugations, an elbow joining said lower and upper flues, means to admit the cotton fibers and air from the gin into the upper portion of the lower flue so that they travel in a transverse direction to said corrugations whereby the foreign substances are removed from the cotton, apertures in said corrugations through which the foreign substances fall, a conveyor positioned beneath the flue onto which the foreign substances are deposited, said elbow being adapted to change the movement of the cotton fibers and air currents leaving the lower flue so that the movement of the fibers and air currents will be in a direction transverse to the corrugations in the upper flue whereby the foreign substances still remaining in the cotton fibers will fall through apertures in the corrugations of the upper flue, a conveyor located beneath said upper flue onto which the foreign substances are deposited and means to convey the foreign substances deposited onto the upper conveyor to the conveyor associated with said lower flue.

3. An apparatus for removing foreign substances from cotton fibers after said fibers have left the gin comprising a lower flue provided with longitudinal corrugations, an upper flue having transversely extending corrugations, an elbow joining said lower and upper flues, means to admit the cotton fibers and air from the gin tangentially into the lower flue so that they travel in a transverse direction to said corrugations whereby the foreign substances are removed from the cotton, apertures in the corrugations through which the foreign substances fall, a conveyor positioned beneath the flue onto which the foreign substances are deposited, said elbow being adapted to change the movement of the cotton fibers and air currents leaving the lower flue so that the movement of the fibers and air currents will be in a direction transverse to the corrugations in the upper flue whereby the foreign substances still remaining in the cotton fibers will fall through apertures in the corrugations of the flue, a conveyor located beneath said upper flue onto which the foreign substances are deposited and means to convey the foreign substances deposited onto the upper conveyor to the conveyor associated with said lower flue.

4. An apparatus for removing foreign substances from cotton fibers after said fibers have left the gin comprising a lower flue provided with longitudinal corrugations, an upper flue having transversely extending corrugations, an elbow joining said lower and upper flues, means to admit the cotton fibers and air from the gin into the upper portion of the lower flue so that they travel in a transverse direction to said corrugations whereby the foreign substances are removed from the cotton, apertures in the corrugations through which the foreign substances fall, a "dead air" space provided beneath said lower flue, a conveyor positioned within the said "dead air" space onto which the foreign substances are deposited, said elbow being adapted to change the movement of the cotton fibers and air currents leaving the lower flue so that the movement of the fibers and air currents will be in a direction transverse to the corrugations in the upper flue whereby the foreign substances still remaining in the cotton fibers will fall through apertures in the corrugations of the upper flue, a "dead air" space located beneath said flue, a conveyor disposed within said "dead air" space onto which the foreign substances are deposited and means to convey the foreign substances deposited onto the upper conveyor to the conveyor associated with said lower flue.

5. An apparatus for removing foreign substances from cotton fibers after said fibers have left the gin comprising a lower flue provided with longitudinal corrugations, an upper flue having transversely extending corrugations, an elbow joining said lower and upper flues, means to admit the cotton fibers and air from the gin tangentially into the upper portion of the lower flue so that they travel in a transverse direction to said corugations whereby the foreign substances are removed from the cotton, apertures in said corrugations through which the foreign substances fall, a "dead air" space provided beneath said lower flue, a conveyor positioned within the said "dead air" space onto which the foreign substances are deposited, said elbow being adapted to change the movement of the cotton fibers and air currents leaving the lower flue so that the movement of the fibers and air currents will be in a direction transverse to the corrugations in the upper flue whereby the foreign substances still remaining in the cotton fibers will fall through apertures in the corrugations of the upper flue, a "dead air" space located beneath said flue, a conveyor disposed within said "dead air" space onto which the foreign substances are deposited and means to convey the foreign substances deposited onto the upper conveyor to the conveyor associated with said lower flue.

6. An apparatus for removing foreign substances from ginned cotton, comprising a flue having longitudinal corrugations in its bottom, a second flue having transverse corrugations in its bottom, means for introducing a stream of cotton fibers and air tangentially into the longitudinally corrugated flue, and means for directing the discharge from the longitudinally corrugated flue axially into the transversely corrugated flue.

7. An apparatus for removing foreign substances from ginned cotton, comprising a flue having longitudinal corrugations in its bottom, a second flue having transverse corrugations in its bottom, means to introduce a stream of cotton fibers and air tangentially into the longitudinally corrugated flue, means to direct the discharge of the longitudinally corrugated flue into the transverse corrugated flue, and a dead air space disposed beneath each flue into which the foreign substances fall from the flue.

JAMES FRANKLIN GRAHAM.